Feb. 23, 1954 G. E. PARKER 2,669,973
CONDITION REGULATING APPARATUS
Filed June 19, 1950 2 Sheets-Sheet 1
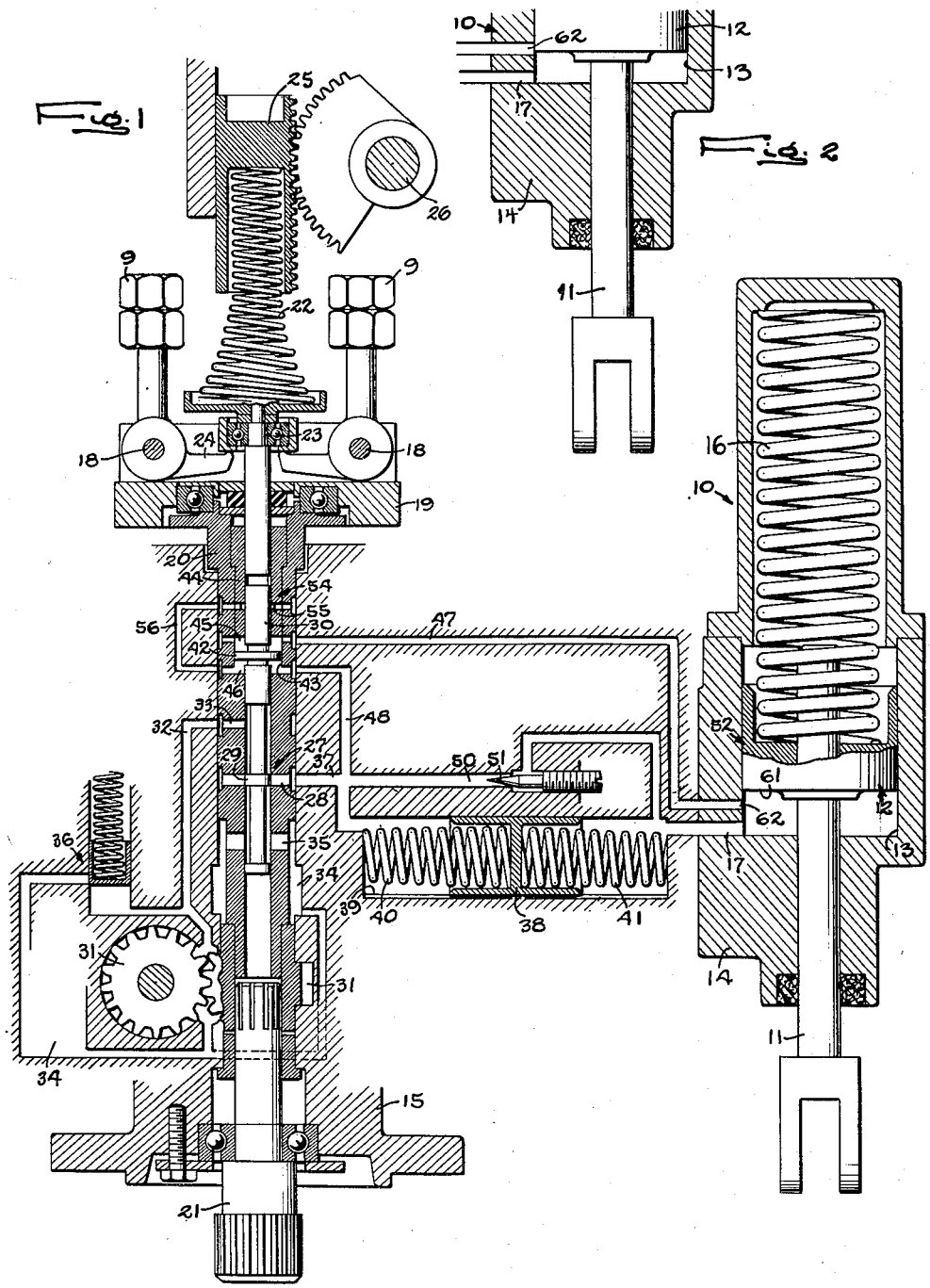
INVENTOR
George E. Parker
By Carlson, Pitzner, Hubbard & Wolfe
ATTORNEYS Feb. 23, 1954 G. E. PARKER 2,669,973
CONDITION REGULATING APPARATUS
Filed June 19, 1950 2 Sheets-Sheet 2
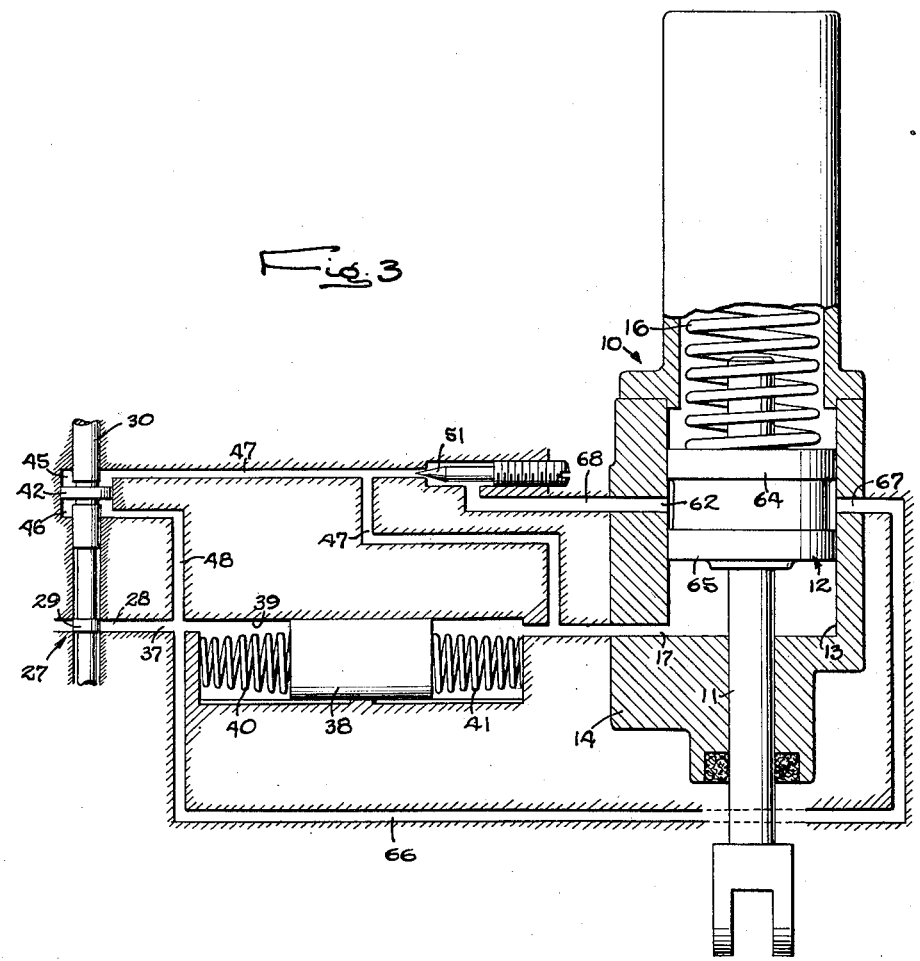

Patented Feb. 23, 1954

2,669,973

UNITED STATES PATENT OFFICE 2,669,973

CONDITION REGULATING APPARATUS

George E. Parker, Rockford, Ill., assignor to Woodward Governor Company, Rockford, Ill., a corporation of Illinois Application June 19, 1950, Serial No. 168,970

10 Claims. (Cl. 121—42)

This invention relates to apparatus for controlling the operation of a power servo in accordance with variations in a control force produced by deviations in a condition to be controlled from a desired value. In certain of its aspects, the invention has more particular reference to apparatus incorporating a so-called compensating mechanism for obtaining stability in the positioning of the regulator while maintaining the regulated condition at a constant value.

In the operation of a governor controlled prime mover, the speed of the prime mover lags by a substantial amount the motion of the throttle and governor controlled servo following a sudden dropping of the load or rapid changing of the governor speed setting to maximum or minimum values. This sometimes results in a substantial delay in restarting the corrective action of the governor and as a consequence, the prime mover speed will under the above conditions depart an objectionable amount from the governor speed setting before the corrective action by the governor starts.

The primary object of the invention is to overcome the foregoing difficulty by modifying the governor action through the application of a supplemental control force derived automatically in response to the occurrence of conditions above referred to.

Another object is to utilize the hydraulic compensating or modifying system of the governor in a novel manner to eliminate the objectionable and momentary overspeeding or underspeeding of the engine above referred to.

A more detailed object is to disable the fluid leakage restriction of the governor compensating system under the conditions which cause the objectionable speed variation whereby to retain the full value of the existing compensating force in initiating an earlier speed corrective action by the governor.

A further object is to effect the disabling action above referred to hydraulically through the medium of a valve responsive to the motion of the governor servo.

Other objects and advantages of the invention will become apparent from the following detailed description taken in connection with the accompanying drawings, in which:

Figure 1 is a fragmentary sectional view and hydraulic circuit diagram of a control apparatus embodying the novel features of the present invention.

Fig. 2 is a fragmentary view of a part of Fig. 1 showing another position of certain of the parts.

Fig. 3 is a schematic view and hydraulic circuit diagram of a modified form of the invention.

For purposes of illustration, the invention is shown in the drawings incorporated in a regulating apparatus of the hydraulic type in which changes in a condition to be regulated, the speed of a prime mover in this instance, govern a servo actuator 10 for selectively positioning a rod 11 connected to the regulator or throttle by which the speed of the prime mover is controlled. In the form shown in Fig. 1, the servomotor is of the single acting hydraulic type comprising a piston 12 reciprocable in a stationary cylinder 13 which may, as shown, be supported within a housing 14 attached to the lower end of the casing 15 of the governor proper. The regulator rod 11 is urged in the speed-decreasing direction by a compression spring 16. Fluid under pressure is introduced into or withdrawn from the head end of the cylinder 13 through a passage 17 to control the energization of the servo and therefore the position of the regulator rod.

While various means may be employed to detect changes in the prime mover speed, the means herein shown comprises upstanding weights 9 pivoted at 18 on a head 19 which is fast on the upper end of a ported sleeve 20 rotatable in a bushing which is supported in the casing 15. The lower end of the sleeve 20 is spline coupled to a shaft 21 driven by the prime mover which is controlled by the governor. The centrifugal force acting on the flyballs is balanced against a compression spring 22 bearing downwardly against the inner race of a ball thrust bearing 23 whose outer race is engaged by arms 24 of the flyballs. The speed-setting of the governor may be adjusted by manually turning a shaft 26 to shift a member 25 and thereby vary the speeder spring stress. The control force derived from changes in the flyball speed is applied mechanically to a pilot valve 27 formed by ports 28 in the sleeve 20 coacting with a land 29 on a stem 30 which is slidable in the rotating sleeve and is connected at its upper end to the inner race of the bearing 23.

Fluid at a substantially constant super-atmospheric pressure is supplied by a pump including gears 31, one of which is coupled to the lower end of the sleeve 20. Through a passage 32 and a port 33 in the sleeve 20, oil supplied under pressure by the pump is delivered into the sleeve above the land 29. The pump inlet communicates with sump spaces 34, one of which is connected through holes 35 with the interior of the sleeve 20 below the land 29. The pressure delivered by the pump is maintained approximately constant by a spring loaded valve 36 which by-passes fluid to the sump when the supply line pressure exceeds a predetermined value.

Pressure fluctuations in the space 37 to which fluid is delivered or from which it is released when the valve is open are communicated to the servo cylinder 13 through a piston 38 in a cylinder 39, the two being yieldably urged in opposite directions and relatively movable in response to pressure changes in the space 37 and the servo cylinder 13. Herein, the piston is movable and the cylinder is fixed with one end in constant communication with the valve passage 37 and the other end connected to the passage 17 leading to the servo cylinder. The piston has equal effective areas at opposite ends and is yieldably urged in opposite directions so as to be maintained in a centered or neutral position when the pressures in the passages 17 and 37 become equalized. This is accomplished by two springs 40 and 41 under some initial compression arranged to act in compression between the piston and opposite end walls of the cylinder 39.

When the land 29, in response to a speed decrease below the prevailing speed setting of the governor, is lowered from its neutral position opening the ports 28, fluid from the supply line 32 will flow into the passage 37 and the connected end of the cylinder 39. The pressure increase therein will move the piston to the right, overcoming and compressing the spring 41 and forcing fluid out of the other cylinder end through the passage 17 and into the servo cylinder 13. The servo piston 12 is thus moved in the speed-increasing direction against its spring 16 and other forces opposing movement of the rod 11. The fuel supply and therefore the engine speed are thus changed to counteract the detected speed decrease. As a result of the displacement of the piston 38, the pressures in the cylinder 39 at the two opposite sides of the wall 38 will differ from each other by an amount determined by the area of the piston and the difference between the loads on the springs 40 and 41 at the new position of the piston.

In operation of the governor, a detected rise in speed causes the valve land 29 to be raised above the valve ports 28. This allows fluid to escape to the sump 34 from the passage 37 thereby decreasing the pressure in the latter. Such pressure reduction allows the plunger 38 to move under the higher pressure existing in the servo cylinder 13 thereby compressing the spring 40 and allowing the servo piston to move under the action of its spring in the speed-decreasing direction. Again there is created a differential between the pressures in the servo cylinder and the valve passage 37, the former being greater than the latter by an amount determined by the area of the piston 38 and the loading of the springs 40 and 41 at the new piston position.

The modifying or so-called compensating effect for producing isochronous or constant speed operation of the prime mover may be derived advantageously from the pressure differential which accompanies any speed change and is developed between the servo cylinder 13 and the valve controlled passage 37. This differential is applied to one of the valve elements to stabilize the system through a drooping characteristic which is then dissipated gradually until, under the new load, the engine speed has been restored to normal as determined by the governor speed setting.

To derive the differential and apply the same to the control valve, a piston 42 secured to the valve stem 30 above the main valve structure is slidable in a cylinder 43 formed within the rotating sleeve 20 and closed on its upper end by a bushing 44 so as to form a chamber 45 above the piston and a chamber 46 of similar size below the piston, the opposite ends of the piston having equal effective pressure areas.

To exert the pressure differentials above referred to on the piston 42 and in the proper direction, the upper chamber 45 is connected by a passage 47 to the passage 17 that leads to the servo cylinder 13. The valve outlet passage 37 is directly connected to the lower chamber 46 through a passage 48. As a result of these connections, the piston 42 and the stem 30 will receive a resultant upwardly directed force following downward movement of the valve stem in response to the detection of a speed decrease. As described above, this force is due to the predominance in the pressure change in the passage 37 and the lower chamber 46 over that in the servo cylinder 13 and in the upper chamber 45. Conversely, when fluid is released from the passage 37 in response to a speed increase, the pressure in both chambers 45 and 46 changes, but that in the upper chamber predominates resulting in the application of a downward force on the receiving piston 42. In each case, the modifying force on the piston 42 urges the valve stem in a direction opposite to its movement which produced the pressure differential, thereby producing the desired drooping characteristic.

Gradual reduction of the drooping characteristic is effected by progressively dissipating the pressure differential through a connecting passage 50 between the passages 47 and 48 having therein a restriction which may be adjusted to vary the rate of leakage between the servo cylinder and the valve outlet passage 37. Herein the restriction takes the form of a needle valve 51 whose screw element is accessible from the exterior of the governor casing.

Assuming that the engine is operating above the normal idling speed and that the compensating system is at equilibrium, the parts will be positioned as shown in Fig. 1. If the load on the prime mover is increased and the speed thereby decreased, the flyballs will move in, allowing the speeder spring 22 to move the control land 29 downwardly to uncover the ports 28 and permit a flow of pressure fluid to the passage 37 and the left end of the cylinder 39, forcing the piston 38 to the right against the action of the spring 41. Fluid is thus forced out of the other end of the cylinder and into the servo cylinder 13, and the prime mover regulator is moved to correct for the speed decrease. As an incident to this, the pressure in the lower chamber 46 is increased above that in the upper chamber 45 by an amount proportional to the movement of the piston 38, resulting in the application to the receiving piston 42 of an upwardly directed restoring force. The drooping characteristic thus produced is maintained by the action of the spring 41 on the piston 38 but starts to dissipate immediately by fluid leakage through the restricted by-pass 51 between the chambers 45 and 46. As the pressure differential decreases, the speed at which a given valve opening is maintained is brought closer to the normal speed setting of the governor, until the normal speed has been restored fully when the pressure differential has been dissipated and the piston 38 returned to balanced position, the system then being in equilibrium.

If the load decreases resulting in a speed increase, the valve land 29 is raised by the flyballs and the energization of the servo is reduced as above described by movement of the piston 38 to the left against the action of the spring 40. A pressure differential is thus created between the chambers 45 and 46 resulting in a force applied to the receiving piston 42 in a downward direction. As before, the droop thus produced is dissipated by the leakage through the needle valve, the normal speed of the prime mover being restored when equilibrium again obtains with the return of the buffer piston 38 to balanced position.

If, during normal operation, the governor speed setting is changed rapidly to the minimum, the servo piston will move quickly to the no-load position that is to its limit at the rod end of the cylinder 13 but, due to the inertia of the prime mover, the speed of the latter will follow at a slower rate and as a result of this lag, the speed of the engine will frequently dip below the desired minimum value before corrective action by the governor will occur. During such movement of the servo, the compensating force derived hydraulically as described above is acting downwardly on the piston 42 and therefore in a direction to increase the speed setting of the governor. In accordance with the present invention, this force is preserved at the proper time in the movement of the servo and thus utilized to produce a supplemental modifying impulse which acts on the control valve in anticipation of the normal corrective action of the governor. As a result, the speed-increasing action which would otherwise await a fall in the engine speed to an objectionably low value is initiated as soon as the servo piston reaches its low limit which occurs before the minimum speed is reached.

The compensating system above described may be adapted readily to produce the desired anticipating action by incorporating in the leakage connection above described an auxiliary valve which is open when the throttle is disposed above the idling setting shown in Fig. 2 and is closed when the throttle is set for lower engine speeds. The servo piston 12 itself may be utilized advantageously as the movable element of this valve and, for this purpose, cooperates with a port 62 at the end of the passage 47 which, it will be observed, is separated from the passage 17 by which the cylinder 39 is connected to the servo. In the form shown in Fig. 1, the port 62 opens into the cylinder slightly below the position in which the lower piston surface 61 is disposed when the piston is in normal idling position shown in Fig. 2.

When the engine is at or above idle speed, the port 62 will be uncovered as shown in Fig. 1, and the leakage connection 50 will function in the normal manner described above, the fluid flow between the chambers 45 and 46 being through passages 48 and 50, the needle valve, passage 17, the cylinder 13, port 62, and passage 47 to the chamber 45. However, when the piston moves in the speed-decreasing direction below and beyond the idle position, the port will be covered thus interrupting the connection 50 so as to retain the then prevailing pressure differential between the servo cylinder and the valve controlled passage 37. As set forth above, the force applied to the pilot valve modifies the fly-ball effect in a direction to produce the desired speed-increasing action of the governor in anticipation of a further but delayed decrease in the lagging engine speed. Objectionable dipping of the engine speed below the desired minimum value is thus avoided without in any way interfering with the desired action of the compensating system at or above the idling speed. In this way, the compensating system is utilized to perform a desirable and supplemental control function under conditions in the operation of the engine when its normal compensating action is not required.

In a similar way, the compensating system of the governor may be utilized to prevent objectionable overspeeding of the engine when the load thereon is dropped suddenly or the throttle is, by sudden adjustment of the governor speed setting, shifted to its maximum speed value. Or, as shown in Fig. 3, provision may be made for applying the supplemental modifying force at both ends of the throttle range. To this latter end, the valve port 62 is located near the center of the servo cylinder 13, and the piston is formed with two lands 64 and 65 axially spaced apart far enough to uncover the port during the major portion of the piston stroke. As the piston nears the rod end of the cylinder and the throttle reaches the lower limit of its speed range, the port 62 becomes covered by the land 64. Similarly, when the piston reaches its other or high speed position, the port is covered by the lower land 65.

The two valves 62, 64 and 62, 65 may be interposed in the leakage connection through the needle valve by various arrangements of the hydraulic connections. Herein, the connection is extended from the valve controlled passage 37 through a passage 66 to a port 67 opening into the cylinder 13 opposite the port 62. The latter is connected through a passage 68 to one side of the needle valve 51 while the passage 47 on the other side of the needle valve leads directly to the remote end of the buffer cylinder 39. With this arrangement, and while the port 62 is uncovered, any pressure differential between the chambers 45 and 46 may be dissipated by leakage through the passage 47, the valve 51, passage 68, ports 62 and 67, and the passages 66 and 48. When the servo piston 12 is in either of its limit positions, the leakage connection will be interrupted at the port 62 thus preventing further dissipation of the pressure acting on the compensating piston 42.

In the lower minimum speed position of the piston when the port 62 is covered by the land 64, the auxiliary modifying force will be directed downwardly on the pilot valve plunger 30 and will act as described above in avoiding a dip in the engine speed below the desired minimum. Conversely, when the servo piston reaches its other or high speed limit, the leakage circuit will be closed by the land 65 preventing equalization of the pressure across the displaced buffer plunger 38 and thus holding the force then being applied in the upward direction to the compensating piston 42. In this way, an increase in the engine above its desired maximum value will be anticipated, and the necessary correction by the governor will be initiated earlier thus preventing objectionable overspeeding of the engine.

I claim as my invention:

1. Apparatus for regulating a condition having, in combination, a servo including a cylinder and a piston adapted for connection to a condition regulator and movable through a predetermined range, a control valve having elements relatively movable in response to changes in said condition and operable selectively to vary the energization of said servo, a hydraulic system operable as an incident to a change in the position of said piston to apply a modifying force to said valve to restore the parts thereof to a neutral position, said system including a restricted passage through which fluid may leak to dissipate said modifying force, and a valve in said leakage passage opened by movement of said piston through the intermediate portion of said range and closed adjacent one end thereof, said valve including a port opening into said cylinder and adapted to be covered and uncovered by said piston.

2. Apparatus for regulating a condition having, in combination, a servo including a cylinder and a piston adapted for connection to a condition regulator and movable through a predetermined range, a control valve having elements relatively movable in response to changes in said condition and operable selectively to vary the energization of said servo, a hydraulic system operable as an incident to a change in the position of said piston to apply a modifying force to said valve to restore the parts thereof to a neutral position, said system including a passage through which fluid may leak to dissipate said modifying force gradually, and a valve in said leakage passage opened by movement of said piston through the intermediate portion of said range and closed adjacent the opposite ends thereof.

3. Regulating apparatus having, in combination, a control device movable in opposite directions away from a normal neutral position, a wall movable with a part of said control device and having opposite effective pressure areas, means coacting with the respective pressure areas to define closed fluid filled chambers, fluid pressure actuated means operable selectively according to the direction of displacement of the control device out of said neutral position to change the pressures in both of said chambers differentially and produce a resultant pressure differential acting to urge said device toward the neutral position, a fluid servo actuator having an actuated element movable through a predetermined range, said actuator being energized selectively in accordance with fluid pressure changes in said fluid pressure actuated means, a fluid connection establishing continuous restricted communication between said chambers for effecting gradual dissipation of said pressure differentials, and valve means actuated by said element and operable to interrupt said connection when said servo element reaches one end of said range.

4. Regulating apparatus having, in combination, a fluid pressure actuator including a fluid filled chamber and a piston movable in response to pressure changes in said chamber, means providing a fluid filled space separated from said chamber by a movable wall, means yieldably urging said wall in opposite directions, a control device operable in response to opposite deviations of a condition to respectively increase and decrease the pressure in said space, a second fluid pressure actuator for applying a compensating force to said control device, means providing fluid connections between said second actuator and said space and chamber to energize the second actuator in accordance with the pressure differential between the space and chamber, means providing a continuous restricted fluid connection between said space and said chamber, and a valve in said connection maintained open during movement of said piston within a predetermined range and closed in response to movement of the piston outside of said range.

5. Apparatus for regulating a condition having, in combination, a servo including an actuated member movable through a predetermined range, a control valve having elements relatively movable in response to changes in said condition and operable selectively to vary the energization of said servo, a hydraulic system operable as an incident to a change in the position of said servo member to apply a modifying force to said valve to restore the parts thereof to a neutral position, said system including a restricted passage through which fluid may leak to dissipate said modifying force, and a valve in said leakage passage opened during movement of said servo member through the intermediate portion of said range and closed when the member is at one end of the range.

6. Apparatus for regulating a condition having, in combination, a servo including an actuated member movable through a predetermined range, a control valve having elements relatively movable in response to changes in said condition and operable selectively to vary the energization of said servo, a hydraulic system operable as an incident to a change in the position of said servo member to apply a modifying force to said valve to restore the parts thereof to a neutral position, said system including means for effecting gradual dissipation of said modifying force, and mechanism operable to maintain said dissipating means operative during movement of said servo actuated member throughout the major portion of its range and to disable the dissipating means when the member approaches one limit of the range.

7. Apparatus for regulating a condition having, in combination, a servo having a movable actuated member, a control valve having elements relatively movable in response to changes in said condition and operable selectively to vary the energization of said servo, a hydraulic compensating system operable as a result of a detected condition change to apply a modifying force to said valve to restore the parts thereof to a neutral position, said system including a restricted passage through which fluid may leak gradually, a valve in said leakage passage, and means responsive to changes in the position of said servo member and operable to open said valve when said member is in one position and to maintain the valve closed in all other positions.

8. Apparatus for regulating a condition having, in combination, a servo having an actuated member movable through a predetermined regulating range, a control device having elements relatively movable out of a neutral position in response to detected condition changes and operable to correspondingly vary the energization of said servo, a compensating system operable as an incident to a change in the energization of said servo to apply a modifying force to said device for restoring said elements to said neutral position and then to dissipate said force gradually, and means responsive to the movements of said servo member and operable as the latter is approaching one limit of said range to interrupt the dissipation of said modifying force then acting on said control device and thereafter retain the value of said modifying force prevailing at the time of such interruption.

9. Apparatus for regulating a condition having, in combination, a servo having an actuated member movable through a predetermined regulating range, a control device having elements relatively movable out of a neutral position in response to detected condition changes and operable to correspondingly vary the energization of said servo, a compensating system operable as an incident to a change in the energization of said servo to apply a modifying force to said device for restoring said elements to said neutral position, means acting after such restoration to effect gradual dissipation of the modifying force, and mechanism operable automatically as said servo member reaches one limit of said range to disable said last mentioned means and thereby retain the then prevailing value of said modifying force.

10. Apparatus for regulating a condition having, in combination, a servo having an actuated member movable through a predetermined regulating range, a control means having elements relatively movable out of a neutral position in response to detected condition changes and operable to correspondingly vary the energization of said servo, a compensating system operable as an incident to a change in the energization of said servo to apply a modifying force to said control means for restoring said elements to said neutral position and then to dissipate said force gradually, a device selectively operable to disable said dissipating means, means responsive to movements of said servo member and operable to maintain said dissipating means active during movement of the member through the major portion of its range, and actuating means for said device responsive to movements of said servo member and operable to maintain said dissipating means active during movement of the member through the major portion of its range and to operate said device to interrupt the dissipation of said modifying force as the member approaches the limit of said range.

GEORGE E. PARKER.

References Cited in the file of this patent
UNITED STATES PATENTS

| Number | Name | Date |
| --- | --- | --- |
| 2,117,891 | Kalin | May 17, 1938 |
| 2,478,753 | Parker | Aug. 9, 1949 |